United States Patent Office 3,016,577
Patented Jan. 16, 1962

3,016,577
PROCESS OF PREPARING SHRINKPROOF FILAMENTS FROM LOW-PRESSURE POLYETHYLENE
Karlheinz Riggert, Frankfurt am Main, Germany, assignor to Farbwerke Hoechst Aktiengesellschaft vormals Meister Lucius & Brüning, Frankfurt am Main, Germany, a corporation of Germany
No Drawing. Filed Apr. 1, 1958, Ser. No. 725,484
Claims priority, application Germany Apr. 6, 1957
5 Claims. (Cl. 18—48)

This invention relates to a process of preparing shrinkproof filaments from low-pressure polyethylene.

The object of the invention is especially a process for the manufacture of filaments, fibers and ribbons or sheets of low-pressure polyethylene possessing improved properties with regard to shrinkage.

Another object of the invention is a process for the manufacture of filaments and fibers of low-pressure polyethylene distinguished by their favorable behavior when exposed to hard abrasion.

It is known that oriented filaments and fibers of low-pressure polyolefins or articles made thereof are geometrically and mechanically unstable when exposed to a heat treatment below their melting point. When heated above room temperature, they contract to a certain extent, a phenomenon which is generally referred to as shrinkage. The degree of shrinkage remains substantially the same when the products of low-pressure polyethylene again reach room temperature. The geometrical change in length and width which occurs not only in the filaments but also in two-dimensional structures such as, for example, sheets, is accompanied, after a heat treatment, by a change in the physical properties, for example, the stress-strain behavior. The tensile strength and the initial gradient of the stress-strain curve (initial modulus) decrease and the ultimate elongation increases, whereby the useful life of low-pressure polyethylene articles is considerably impaired.

By low-pressure polyethylene there is to be understood herein a polyethylene which in the unoriented, pure state has a density higher than 0.930 gram per cubic centimeter (cf. "Chemical Week, June 4, 1955, page 58) and which can be prepared only by the known low-pressure processes. According to present knowledge, this type of polyethylene owes its properties which distinguish it from the high-pressure polyethylene mainly to a low degree of branching of the molecule chains.

Filaments of low-pressure polyethylene differ from filaments of high-pressure polyethylene in various respects:

(1) The melting and softening points of filaments of low-pressure polyethylene are 15–25° C. higher than those of filaments of high-pressure polyethylene.

(2) The tensile strength of filaments of low-pressure polyethylene is up to 8 grams per denier as compared with an average of 2–3 grams per denier for filaments of high-pressure polyethylene.

(3) The initial gradient of the stress-strain curve for filaments of low-pressure polyethylene is higher than that for filaments of high pressure polyethylene.

(4) Filaments of low-pressure polyethylene have a greater bending stiffness than filaments of high-pressure polyethylene.

Now I have found that the shrinking capacity of stretched shaped structures, such as filaments, fibers or sheets of low-pressure polyethylene can be reduced and their stress strain behavior stabilized by subjecting said structures for a short time to a heat treatment in the clamped state, the medium by means of which the heat is carried to the stretched structures having a temperature which lies above the melting point of the material of which the structure is made, i.e. higher than 135° C. When using this method, there is derived the important and unexpected advantage that structures are obtained which not only have a substantially lower shrinking capacity when subjected to a later heat-treatment but which hardly tend to split off when exposed to hard abrasion and, therefore, possess a better abrasion resistance. By "splitting off" there is understood the formation of fine fibrillas sticking out from the surface of the structures which split off especially when said structures pass over rough surfaces or edges. Apart from the poor look, the tendency to split off substantially reduces the abrasion resistance and, thereby, the useful life of the structures.

In carrying out the heat treatment of this invention, the filaments, ribbons or sheets may be clamped in a frame either tightly with the exclusion of any possibility of shrinking, or loosely while admitting a shrinkage up to 20%.

Low-pressure polyethylene filaments may also be wound on a non-flexible bobbin and subsequently be subjected to a heat treatment. Filaments of low-pressure polyethylene may, furthermore, be wound on shrinkage spools which admit of an adjustable shrinkage.

There are achieved especially favorable results when employing the continuous method according to which the filament is passed, for example, over two pairs of rollers (feed rollers and drawing rollers) having a heating zone between. Depending on whether the pair of drawing rollers has a lower or the same peripheral speed as the feed rollers, the heat treatment is carried out with or without permissible shrinkage. When using this method, care has to be taken that the filaments are wound around the pairs of rollers a sufficient number of times so that the filaments cannot slip over the rollers because the filaments are under a certain tension. The filaments may be heated to the processing temperature by means of hot air, hot liquids, steam or by other inert media, or by bringing the structures into contact with heated surfaces. Depending on the thickness of the structures and the temperatures applied, treatment times of $1/10$ of a second to 10 seconds are generally sufficient, while thicker structures and lower temperatures necessitate longer treatment times. The processing temperature to be applied also depends to a considerable extent on the thickness of the structures used; thicker structures require in general a higher processing temperature. The heat treatment is carried out at temperatures ranging from 135 to 250° C. When by the continuous method the hot monofil is conducted after the hot stretching process immediately to the zone of the heat treatment, there are likewise shorter treatment times necessary than when using a monofil which has been cooled to room temperature. When choosing the time of contact of the filaments, monofils or ribbons in the heating zone, care has to be taken that the filaments or monofils do not melt and, consequently, break.

The following examples serve to illustrate the invention, but they are not intended to limit it thereto:

Example 1

A monofilament with a diameter of 0.40 mm. and made of low-pressure polyethylene having a reduced specific viscosity in solution of 2.4 (solvent: tetrahydronaphthalene, concentration: 5 grams/liter, temperature: 120° C.), tensile strength 5.0 grams/denier, ultimate elongation 23%, shrinkage in boiling water: 12%, is fed at a speed of 80 meters/minute over a 3-roller-system to a heating zone having a length of 3 meters and is drawn off by a 3-roller-system rotating at a speed which is by 6% lower than that of the feed rollers. The heating zone consists of several electrically heated metal surfaces which heat the monofilament alternately from both sides by contacting the filament. The temperature of the metal surfaces is 155° C. After having passed the heating zone, the shrinkage which the filament undergoes in boiling water is reduced to 2.5%. Furthermore, when exposing the filament to abrasion by means of a key steel moving to and fro in the longitudinal direction of the filament, there hardly occurs splitting off of the filament, in contrast to the untreated material. After the heat treatment, the tensile strength of the monofilament is 4.8 grams/denier and the ultimate elongation 27%.

*Example 2*

A monofilament of low-pressure polyethylene having a reduced specific viscosity in solution of 2.0 (solvent: tetrahydronaphthalene, concentration: 5 grams/liter, temperature: 120° C.) is stretched 1:9 by means of two pairs of rollers in water having a temperature of 95° C. When leaving the second pair of rollers, i.e. immediately after the stretching process, the monofilament is passed at a speed of 120 meters/minute through a tube having a diameter of 5 cm. and a length of 4 meters, in the course of which process the filament can neither be further stretched nor shrink. The filament is heated by hot air having a temperature of 150° C. which is passed through the tube. After this heat treatment, the filament possesses an improved abrasion resistance. If the filament thus treated is subsequently boiled in water, it shrinks 5% while the untreated filament shrinks 11% under these conditions. The tensile strength of the filament is 5.3 grams/denier after the heat treatment, while the ultimate elongation is 23%.

I claim:
1. A process of substantially reducing the tendency to fibrillate, of substantially increasing the abrasion resistance, and of reducing the shrinkage at elevated temperatures of oriented filaments and fibers made of low pressure polyethylene of high density, which comprises subjecting said articles to a heat treatment employing a heating medium at a temperature in the range from about 135–250° C. for a period of $\frac{1}{10}$ second to 10 seconds whereby the filament is stabilized against shrinkage and extensibility without appreciable decrease in tenacity.
2. Process of claim 1 wherein said filaments and fibers retain their length during the heat treatment.
3. Process of claim 1 wherein the shrinkage of filaments and fibers during said heat treatment is limited to a shrinkage of not more than 20% of their original length.
4. Process of claim 1 wherein the heating medium is a hot fluid.
5. Process of claim 1 wherein the heating medium is a heated metal surface.

References Cited in the file of this patent

UNITED STATES PATENTS

| | | |
|---|---|---|
| 2,325,060 | Ingersoll | July 27, 1943 |
| 2,420,565 | Rugeler et al. | May 13, 1947 |
| 2,517,570 | Irons | Aug. 8, 1950 |
| 2,517,581 | Lowry et al. | Aug. 8, 1950 |
| 2,762,791 | Pease et al. | Sept. 11, 1956 |
| 2,798,283 | Magat et al. | July 9, 1957 |
| 2,824,909 | Edwards et al. | Feb. 18, 1958 |

FOREIGN PATENTS

| | | |
|---|---|---|
| 510,145 | Canada | Feb. 15, 1955 |